United States Patent [19]

Rhodes

[11] 4,324,001
[45] Apr. 6, 1982

[54] SYNCHRONIZER FOR MSK BURST COMMUNICATIONS

[75] Inventor: Smith A. Rhodes, Falls Church, Va.

[73] Assignee: Communications Satellite Corporation, Washington, D.C.

[21] Appl. No.: 178,411

[22] Filed: Aug. 15, 1980

[51] Int. Cl.³ .......................................... H04L 27/10
[52] U.S. Cl. ...................................... 375/90; 375/47; 375/106; 329/112
[58] Field of Search ....................... 375/42, 47, 80, 88, 375/90, 96, 102, 106, 111; 455/139, 314, 315, 316; 328/133, 155; 329/112

[56] References Cited

U.S. PATENT DOCUMENTS

| | | | |
|---|---|---|---|
| 2,977,417 | 3/1961 | Doelz | 375/47 |
| 3,674,934 | 7/1972 | Gooding et al. | 375/90 |
| 3,845,412 | 10/1974 | Rearwin et al. | 375/42 |
| 3,984,777 | 10/1976 | Noguchi | 375/86 |
| 3,992,617 | 11/1976 | Epstein | 375/90 |
| 3,993,868 | 11/1967 | Balcewicz | 375/47 |
| 4,020,283 | 4/1977 | Epstein | 328/133 |
| 4,027,265 | 5/1977 | Kobayashi | 329/122 |
| 4,028,490 | 6/1977 | Epstein | 328/133 |
| 4,072,905 | 2/1978 | Keelty | 329/122 |
| 4,096,442 | 6/1978 | McRae | 329/112 |

OTHER PUBLICATIONS

Telecommunication Numeriques par satellite, Batiment Des Conferences Dell Unesco, Parls 28-30, Nov. 1972.
De Buda, Rudi, IEEE Transactions on Communications, "Coherent Demodulation of Frequency-Shift Keying with Low Deviation Ratio", Jun. 1972.
Wolejsza et al., Digital Satellite Communication, "PSK Modems for Satellite Communications", Nov. 25-27, 1969.

Primary Examiner—Benedict V. Safourek
Assistant Examiner—Stephen Chin

[57] ABSTRACT

A synchronization preamble for each TDMA burst consists of an alternating sequence of the two MSK tones on every other MSK bit interval. Such a preamble does not exhibit random polarity reversals at the two MSK frequencies as occurs during the message burst. The receiving circuit therefore directly processes the preamble symbols to extract carrier phase and symbol synchronization without conventionally squaring the IF to remove polarity modulation. A 6 dB increase in synchronization SNR is thereby provided since the requisite synchronizer filtering need only be effected at the fundamental frequencies $F_L$ and $F_H$ rather than at the their second harmonics $2F_L$ and $2F_H$ as is required when squaring is employed.

12 Claims, 4 Drawing Figures

SYNCHRONIZATION, DEMODULATION AND BIT DETECTION FOR MSK.

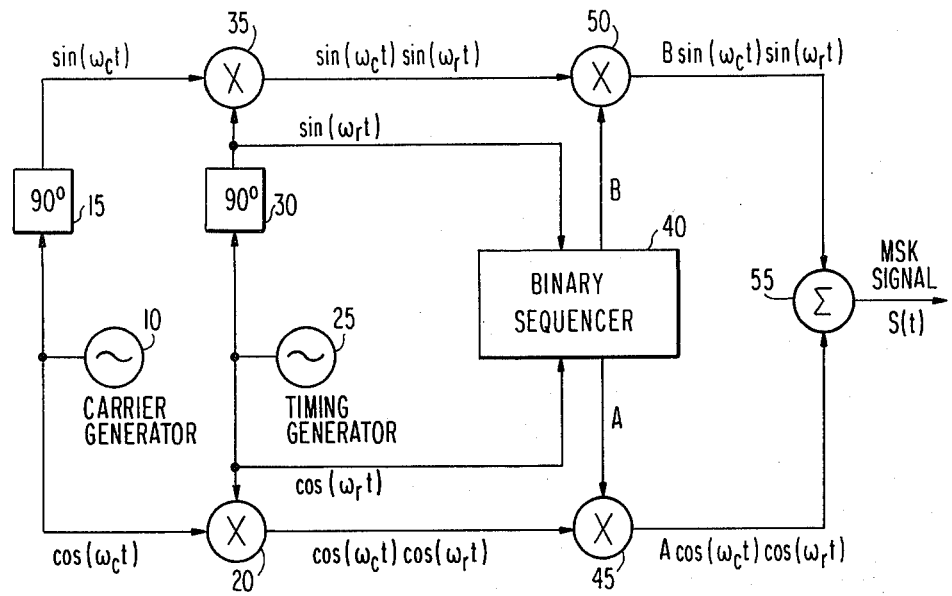
FIG. 1 GENERATION OF MSK SIGNAL AS OFFSET QPSK WITH HALF-CYCLE SINUSOIDAL SHAPING OF PULSES.
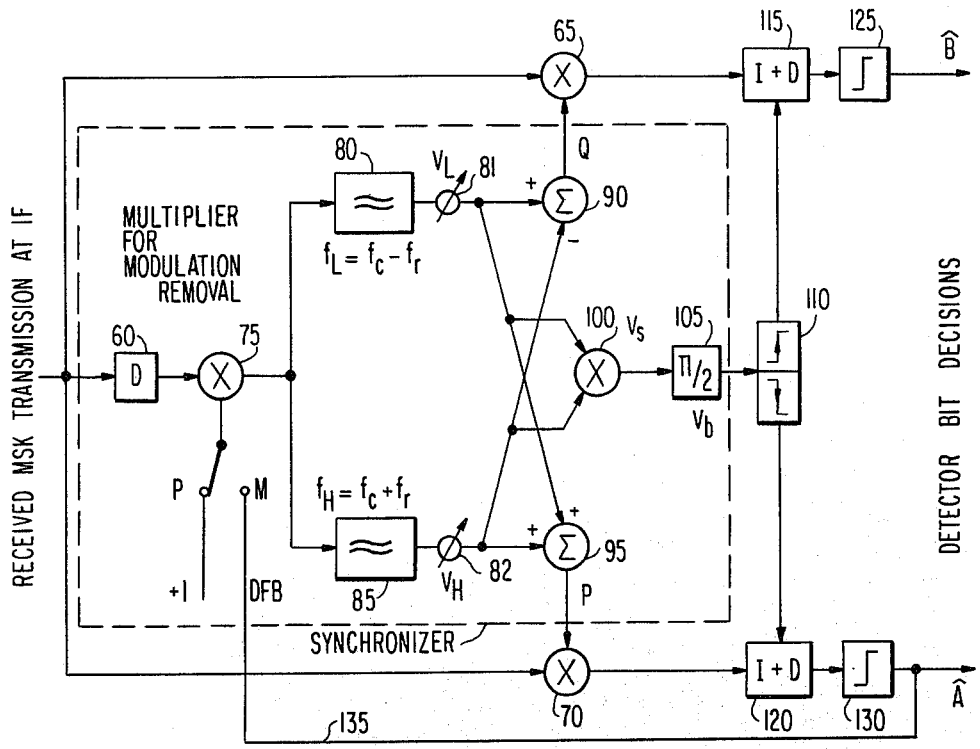
FIG. 4 SYNCHRONIZATION, DEMODULATION AND BIT DETECTION FOR MSK.

SYNCHRONIZER FOR MSK BURST COMMUNICATIONS

FIELD OF THE INVENTION

This invention relates to circuitry for providing carrier and symbol synchronization for burst transmitters with MSK (minimum shift keying) modulation in which both carrier phase and symbol timing must be reacquired for each burst from a short synchronization preamble.

BACKGROUND OF THE INVENTION

Various techniques are utilized to provide carrier and symbol synchronization signals for burst communications with MSK modulation. Of particular interest is the DeBuda synchronization circuit for fast frequency shift keying (FFSK). See Rudi DeBuda, "Coherent Demodulation of Frequency-Shift Keying with Low Deviation Ratio", IEEE Transactions on-*Communications*, June 1972, pages 429–435. The only difference between the FFSK technique described by DeBuda and the MSK technique applicable herein is that the FFSK process has some pre-coding operation prior to modulation, such as differential encoding. For the purposes herein, this procedural difference can be ignored.

The MSK modulation imparts a continuous phase advance or delay upon the carrier signal depending upon the value of the transmitted bit sequences. This change in the carrier signal phase imparts a secondary modulation upon the signal which must be removed. Specifically, this modulation is manifested in the polarity of the MSK signal at either of the higher or lower frequency tones; these tones can have a positive or negative polarity.

In order to remove this modulation, synchronizer circuits such as the one taught in the DeBuda article, above, employ a squaring technique to remove the effect of the modulation on the polarities of the two MSK tones. This squaring technique consequently results in the doubling of the frequencies of the two MSK tones.

Although the signal squaring technique removes this secondary modulation effect, it also introduces an approximately 6-dB loss in signal to noise ratio (SNR), and further results in a four-state phase ambiguity. The 6-dB loss in SNR results from requisite filtering at the second harmonic of the two MSK tones rather than at the fundamental frequencies. Each of the two filtering processes results in another 6 dB loss since only one frequency is present at any time while noise is always present in approximately equal amounts at both upper and lower frequencies. Since the signal is filtered through a pair of parallel branches (higher and lower frequencies) the SNR for each filter is reduced by a factor of 2, or 6 dB. Thus the necessity of filtering the MSK signal at the harmonic frequencies introduces a pair of 6 dB losses in SNR, for a total SNR loss of 12 dB.

Furthermore, the 4-state ambiguity in phase can only be removed by differential coding or additional preamble overhead in the form of a known bit sequence.

SUMMARY OF THE PRESENT INVENTION

It is therefore an object of the present invention to provide a method and apparatus for both generating and extracting carrier and symbol synchronization signals for burst transmissions with MSK modulation which do not require a signal squaring technique in order to remove carrier polarity modulation.

It is a further object of the present invention to provide a method and apparatus for generating an MSK preamble, the signal at each of the two MSK tones always having the same polarity.

It is a further object of the present invention to provide an MSK transmission technique which can operate on a shorter preamble by avoiding the requirement of signal squaring and the resulting doubling in frequency. Thus, in accordance with the present invention the 6-dB loss in SNR and the 4-state phase ambiguity produced in the prior art techniques are avoided.

BRIEF DESCRIPTION OF THE DRAWINGS

FIG. 1 is a block diagram of an MSK transmission apparatus which can be employed to provide a preamble in accordance with the present invention.

FIG. 4 is a block diagram of the synchronization, demodulation, and bit detection circuit in accordance with the present invention.

DETAILED DESCRIPTION OF THE INVENTION

Figure 2:
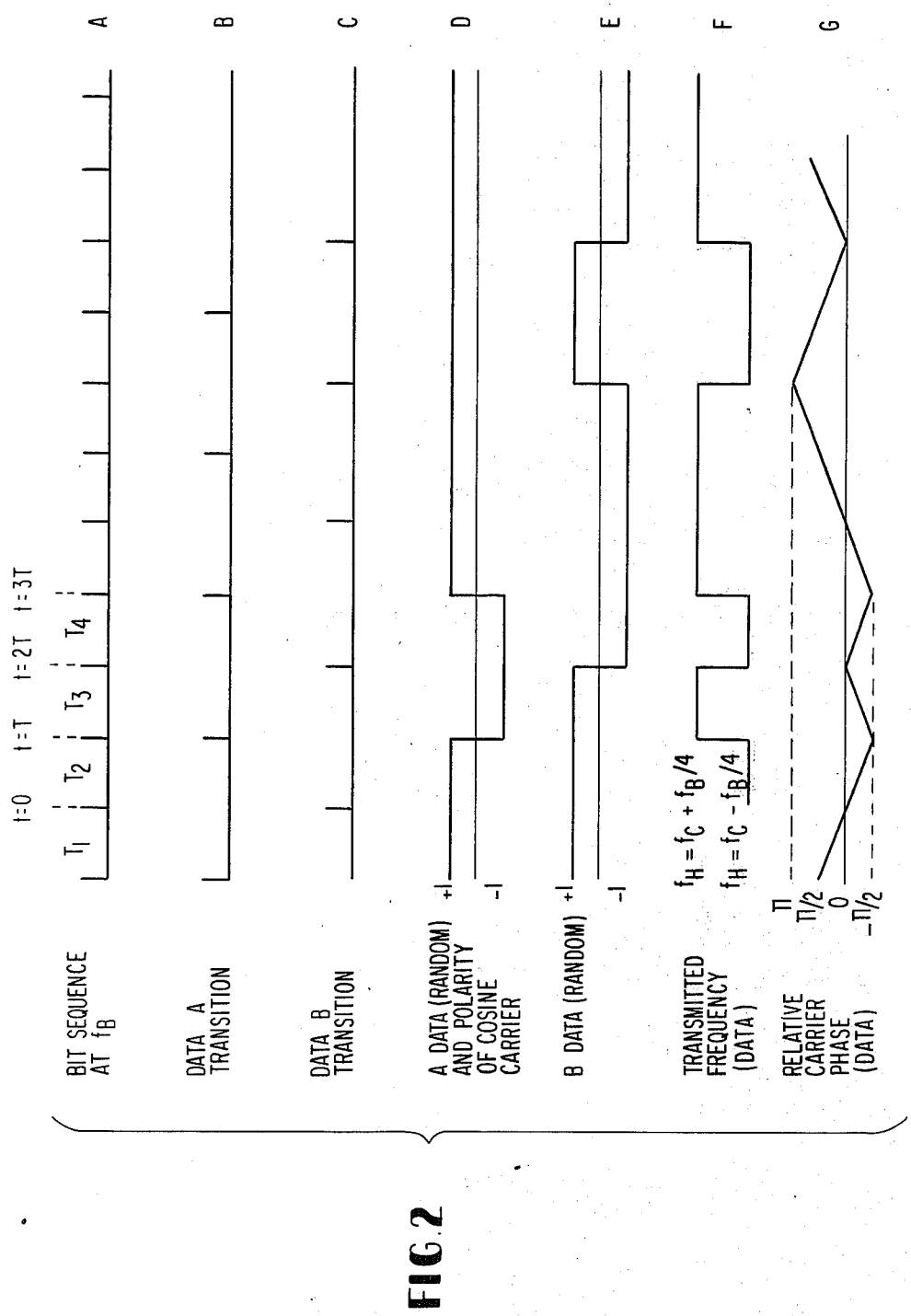
FIG. 2 is a timing diagram of bit timing sequences, polarity, and carrier phase for bit sequences transmitted during the message portion of a TDMA burst.

Minimum shift keying (MSK) is defined as a continuous phase frequency shift key (FSK) signal with a modulation index of 0.5. Therefore, the upper and lower tones are frequency shifted by $F_b/4$ above and below the carrier frequency $f_c$, where $F_b$ is the signaling rate in bits per second. If the MSK signal were to be detected as a form of coherent FSK, its detection performance would be inferior to that of other detection techniques such as coherent PSK. However, it can be shown that an MSK transmission is mathematically equivalent to offset quaternary phase shift keying (O-QPSK) with staggered binary modulation pulses having the half-cycle sinusoid shapes. Therefore, the MSK signal can be coherently detected as O-QPSK to thereby provide the better detection performance associated with coherent PSK.

Not only may the MSK signal be detected as a special form of O-QPSK, but it is also convenient to generate the MSK signal in this manner. The bit sequences are divided into in-phase and quadrature bits with polarity designations A and B. Then, with the MSK frequency offset $f_r = F_b/4$, the MSK signal may be generated with the apparatus illustrated in FIG. 1 using the following relationship:

$$S(t) = \sqrt{C}\ [A \cos \omega_r t \cos \omega_c t + B \sin \omega_r t \sin \omega_c t],$$

where C is the carrier power. Generator 10 applies an in-phase carrier signal having frequency $\omega_c$ to mixer 20 and to 90° phase shifter 15. The output of the phase shifter 15 provides the quadrature carrier signal to mixer 35. Timing generator 25 applies the signal $\cos(\omega_r t)$ having a frequency $f_r = F_b/4$ to mixer 20 and to 90° phase shifter 30. The output of the phase shifter 30 is applied to mixer 35. The sine and cosine signals are also applied to binary sequencer 40.

The outputs of mixers 20 and 35 are applied to mixers 45 and 50 respectively. The binary sequencer 40 provides the polarity designations A and B to mixers 45 and 50, which can independently take on the values of +1 and −1. The transition times for the polarity designations A and B are offset by period T which is an MSK bit interval. The bit intervals A and B each have periods of 2T and therefore overlap by T. This is illustrated in FIG. 2 where plot A illustrates the bit sequence at bit rate $F_b$, each bit having a duration T. The individual A and B data (±1) may change polarity only once every 2T, and are offset with respect to each other by a single bit interval T. Note that the transition points for A and B alternate, the B data having transition points at times t=0, 2T, 4T, 6T..., the A data having transition points at times t=T, 3T, 5T....

It can be shown mathematically that the O-QPSK transmission with the half-cycle sinusoid pulse shapes are FSK in nature by noting that:

$$S(t) = \sqrt{C}\,[A \cos(\omega_r t) \cos(\omega_c t) + B \sin(\omega_r t) \sin(\omega_c t)],$$

where A and B independently take on the values of +1 and −1. Since $$S_1 = A \cos(\omega_r t)\cos(\omega_c t) = \tfrac{1}{2}A \cos(\omega_L t) + \tfrac{1}{2}A \cos(\omega_H t),$$

and $$S_2 = B \sin(\omega_r t)\sin(\omega_c t) = \tfrac{1}{2}B \cos(\omega_L t) - \tfrac{1}{2}B \cos(\omega_H t),$$

where $\omega_L = \omega_c - \omega_r$ and $\omega_H = \omega_c + \omega_r$, s(t) can be seen to be an FSK signal with frequencies $\omega_L$ and $\omega_H$. If A=B, then $S(t) = S_1 + S_2 = A \cos \omega_L t$, and if A=−B, then $S(t) = S_1 + S_2 = A \cos(\omega_H t)$. Furthermore, the polarity of the cosine that represents the tone at either frequency is determined entirely by the polarity of A as indicated at plot D, FIG. 2. Since the signals A and B are staggered in time, the frequency shift $\pm \omega_r$ can be changed at each bit interval T. The signal is MSK in nature since the output signal from summing device 55 has a continuous phase and a tone separation of 0.5 $F_b$.

Since A can take on the value of either +1 or −1 when the bit sequence is random, the polarity of the transmitted MSK tones will randomly take on a value ±1 as determined by A. Therefore, where the value of the bit sequences is random, squaring is required to remove the polarity reversals where A=−1. This is illustrated in the remaining portion of FIG. 2. Plots D and E show random sequences of A and B data. Plot F illustrates that the lower frequency $f_c - F_b/4$ is transmitted during intervals T1 and T2. As A changes from positive to negative 1 at interval T3, the upper frequency $F_H = f_c + F_b/4$ is transmitted. Similarly, upon the transition from +1 to −1 of B at T4, the transmitted frequency reverts to $F_L$. Plot G illustrates that the relative carrier phase linearly decreases at a rate of 90° per interval T when $F_L$ is transmitted, and linearly increases at the same rate when $F_H$ is transmitted.

Figure 3:
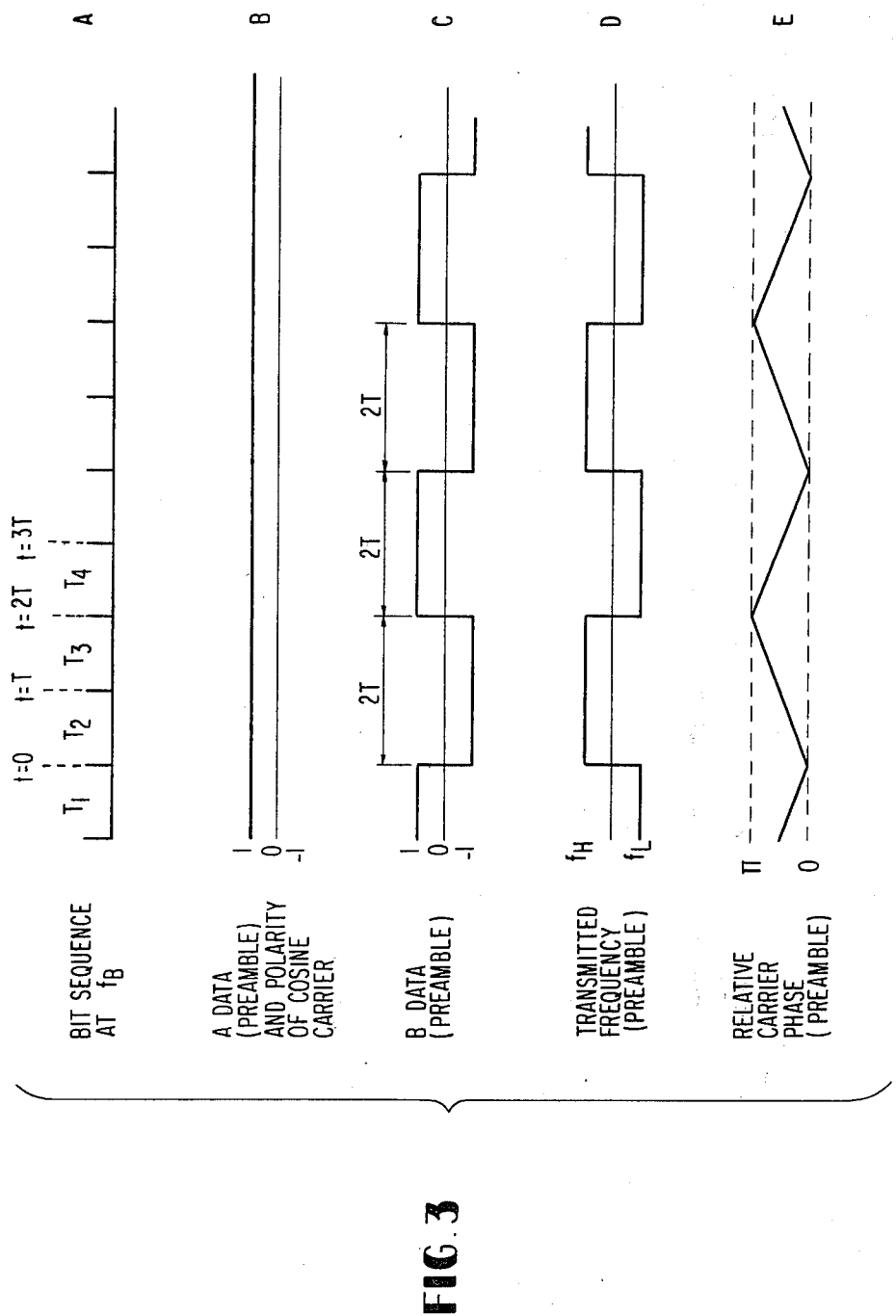
FIG. 3 is a timing diagram of bit timing sequences, polarity, transmitted frequency and carrier phase for the bit sequences transmitted in the preamble of a TDMA burst in accordance with the present invention.

The present invention avoids the squaring requirement by employing the fact that the preamble need not be random. This is accomplished by maintaining the value of A at +1 during the synchronization preamble, since it is the value of A which determines the polarity of the cosine carrier of the MSK signal. Since it is desirable for the MSK preamble to spend an approximately equal time at each tone, an alternating sequence of +1 and −1 for the values of B is chosen. Therefore, the transmitted frequency will alternate between the high and low tones in accordance with the polarity of B/A, and will alternate between $F_H$ and $F_L$ only on every other MSK bit interval, as shown in Plot D of FIG. 3. During each interval of 2T, the carrier phase increases or decreases linearly in time for a total phase change of $\pm \pi$ radians in each 2T interval. Thus, the preamble generated in this manner will have no polarity modulation imparted on the cosine carrier of the MSK signal, and consequently does not require a squaring operation to remove polarity modulation. The binary sequencer 40 in FIG. 1 is of well known construction and may easily be modified to provide the required levels shown as Plots B and C in FIG. 3 during the preamble.

The synchronization and demodulation circuit in accordance with the present invention is illustrated in FIG. 4. The received MSK signal at an intermediate frequency is applied to delay device 60 and mixers 65 and 70. The output of the delay device 60 is mixed with one of two signals in mixer 75 such that during the preamble, the signal from delay means 60 will be mixed with a positive signal so that no polarity inversion occurs, since none is expected. However, after the synchronization preamble, the message burst follows with a statistically random bit sequence for both A and B which causes polarity modulation. Since synchronization will have been acquired during the preamble, good detection performance can be obtained during the message burst and detection decisions on line 135 can be fed back to the mixer 75 in order to correct the polarity whenever A takes on the value of −1. This correction is referred to as modulation removal by means of decision feedback (DFB). The DFB does not introduce the 6 dB loss in SNR that is associated with the frequency doubling in the squaring method.

Switching between terminals "P" and "M" can be accomplished in one of several ways. The input can be switched to the "P" terminal at a time just prior to the reception of the burst, which time is known a priori to the ground station receiver. It is noted that the time for switching between the "P" and "M" terminals need only be approximate since there will typically be sufficient preamble overhead to extract the carrier and symbol synchronization.

The input to mixer 75 may be switched from the "P" terminal to the "M" terminal to receive the decision feedback in one of two other ways. The first technique utilizes a unique word detected at the end of the preamble and the beginning of the message portion of the burst to effect the transition to DFB. The second technique for performing this transition would be to measure the energy provided at the output of filters 80 and 85. An increase in the energy output from filters 80 and 85 indicates that the signal being received is unipolar. Since the preamble polarity is by definition unipolar, as opposed to the message portion of the burst which is of random polarity, the high energy level output from the filters can be used to switch to DFB. Of course, the P terminal will impart a positive polarity to the mixer 75 for as long as the preamble is being received.

The signal from mixer 75 is applied to the low and high frequency filters 80 and 85 respectively, to produce coherent references for both the carrier waveform and bit timing. The filter outputs in the absence of noise may be represented by:

$$V_L = \sqrt{2C_L} \cos(\omega_c t - \omega_r t + \theta_c), \text{ and}$$

$$V_H = \sqrt{2C_H} \cos(\omega_c t + \omega_r t + \theta_c),$$

where $C_L$ and $C_H$ are the power levels of the filter outputs, and $\theta_c$ is the arbitrary phase angle of the received tones. Adjustable phase shifters 81 and 82 are provided for manual adjustment of the absolute carrier reference phase. The carrier references for the two binary channels are obtained from linear combinations of $V_H$ and $V_L$. If $C_L = C_H = C_1$, $$P = \frac{V_L + V_H}{2} = \sqrt{2C_1} \cos(\pi F_s t)\cos(2\pi f_c t + \theta_c), \text{ and}$$

$$Q = \frac{V_L - V_H}{2} = \sqrt{2C_1} \sin(\pi F_s t)\sin(2\pi f_c t + \theta_c)$$

The quadrature carrier references include the shaping functions of $\cos(\pi F_s t)$ and $\sin(\pi F_s t)$ where $F_s = 0.5 F_b = 1/(2T)$, the shaping functions corresponding to the pulse shapes for the two staggered bit streams. Therefore, after demodulation with the shaped carrier references in mixers 65 and 70, integration over the correct bit intervals will result in matched filtering of the binary wave form. This matched filtering maximizes the SNR prior to detection. The P reference developed in adder 95 is used to obtain the bit stream A for the in-phase or cosine channel. The Q reference developed in subtractor 90 is used to obtain the bit stream B which is referred to as the quadrature or sine channel with an offset bit timing.

Integration over the correct symbol intervals is accomplished by the use of timing pulses developed from the symbol timing wave form. The product $V_H V_L$ is developed in mixer 100. The lower side band (LSB) of the product of the two filter outputs yields a cosine wave $V_s$ having the frequency $2f_r = F_b/2$, $f_r$ being the magnitude of the MSK frequency shift:

$$V_s = LSB(V_L V_H) = \sqrt{C_L C_H} \cos(\pi F_b t).$$

A 90° phase shift of $V_s$ is effected by shifter 105 and is used to provide the bit timing waveform:

$$V_b = \sqrt{C_L C_H} \sin(\pi F_b t).$$

The sampling is performed at the end of the symbol integration period. For the A bit sequence, sampling times are determined in transition detector 110 from the negative going transitions of $V_b$, while the sampling times for the B bit streams are obtained from the positive going transitions of $V_b$.

The integration of the demodulated bit waveforms A and B is performed by integrate and dump devices 115 and 120, of well-known construction. The binary bit decisions are performed in bit decision detectors 125 and 130, also of well-known construction. The bit decisions on A are fed back to the synchronizer during the message burst for the purpose of polarity modulation removal. The delay device 60 is required at the input to the synchronizer prior to the removal of polarity modulation so that the DFB multiplier will be applied at the correct time interval.

Various changes, additions, and omissions of elements may be made within the scope and spirit of this invention. It is to be understood that the invention is not limited to specific details, examples, and preferred embodiments shown and described herein.

I claim:

1. An apparatus for demodulating a burst signal having a preamble portion and a message portion comprising first (70) and second (65) mixers having said burst signal applied directly thereto;

a third mixer having said burst signal applied thereto by way of delay means;

first and second band pass filters receiving an output of said third mixer, said first and second band pass filters having upper and lower center frequencies, respectively;

first signal combining means (90, 95) receiving outputs from said first and second band pass filters for providing first and second reference signals in phase quadrature, said first and second reference signals being applied to said first and second mixers, respectively, to thereby demodulate said burst signal with (i) said first reference signal in said first mixer and (ii) said second reference signal in said second mixer;

second signal combining means receiving outputs from said first and second band pass filters for providing first and second timing signals;

first and second data generating means receiving outputs from said first and second mixers, respectively, for generating first and second binary signals under the control of said first and second timing signals;

means (135) for applying said first binary signal to said third mixer when said message portion of said burst signal is being received to thereby demodulate the polarity of said message portion in accordance with said first binary signal; and means for applying a constant signal level to said third mixer when said preamble portion of said burst signal is being received to thereby avoid polarity demodulation of said preamble portion of said burst signal.

2. The apparatus of claim 1 wherein said first signal combining means comprises means for adding said outputs from said first and second band pass filters to provide said first reference signal; and means for providing the difference between said outputs of said first and second band pass filters to provide said second reference signal.

3. The apparatus of claim 1 wherein said second signal combining means comprises:

a fourth mixer receiving said outputs from said first and second band pass filters;

90° phase shift means receiving an output from said fourth mixer and providing a phase shifted signal; and transition detection means receiving said phase shifted signal for providing said first timing signal upon detecting a negative-going transition of said phase shifted signal and for providing said second timing signal upon detecting a positive-going transition of said phase shifted signal.

4. The apparatus of claim 1 wherein said second signal combining means comprises:

a fourth mixer receiving said outputs from said first and second band pass filters; and transition detection means receiving the output of said fourth mixer for providing said first timing signal upon detecting a positive-going transition of said output of said fourth mixer and for providing said second timing signal upon detecting a negative-going transition of said output of said fourth mixer.

5. The apparatus of claims 1, 3 or 4 wherein said first data generating means comprises a first integrate-and-dump circuit receiving said output of said first mixer, and a first bit decision detector receiving the output of said first integrate-and-dump circuit said first integrate-and-dump circuit controlled by said first timing signal; and said second data generating means comprises a second integrate-and-dump circuit receiving said output of said second mixer, and a second bit decision detector receiving the output of said second integrate-and-dump circuit, said second integrate-and-dump circuit controlled by said second timing signal.

6. An apparatus for providing carrier and symbol synchronization for a burst transmission signal having short synchronization preamble and message portions, wherein carrier phase and symbol timing are acquired for each burst from said short synchronization preamble, said apparatus comprising:

a first mixer (75) having a delayed burst transmission applied thereto for providing a first mixed signal;

first and second band pass filter means receiving said first mixed signal to provide first and second filtered signals;

first signal combining means receiving said first and second filtered signals for providing first and second carrier phase reference signals in phase quadrature;

second signal combining means receiving said first and second filtered signals for providing first and second symbol timing signals, said first and second symbol timing signals being offset in time from one another;

means for applying a constant signal level to said first mixer when said preamble portion is being received to thereby avoid polarity demodulation of said preamble portion; and means for applying a variable signal level to said first mixer when said message portion is being received to thereby demodulate the polarity of said message portion in accordance with said variable signal level.

7. The apparatus of claim 6 wherein said second signal combining means comprises:

a second mixer receiving said first and second filtered signals;

90° phase shift means receiving an output from said second mixer and providing a phase shifted signal;

transition detection means receiving said phase shifted signal for providing said first symbol timing signal upon detecting a negative-going transition of said phase shifted signal and for providing said second symbol timing signal upon detecting a positive-going transition of said phase shifted signal.

8. The apparatus of claim 6 wherein said second signal combining means comprises:

a second mixer receiving said first and second filtered signals; and transition detection means receiving an output from said second mixer for providing said first symbol timing signal upon detecting a positive-going transition of said output from said second mixer, and for providing said second symbol timing signal upon detecting a negative-going transition of said output from said second mixer.

9. The apparatus of claims 6, 7 or 8 wherein said first signal combining means comprises:

means for adding said first and second filtered signals to provide said first carrier phase reference signal; and means for providing the difference between said first and second filtered signals to provide said second carrier phase reference signal.

10. A method of transmitting a group of MSK symbols at a predetermined rate in a burst of data having a preamble portion and a message portion, individual symbols being transmitted in individual symbol intervals, said method comprising:

(a) generating a first sinusoidal carrier signal;

(b) generating a second sinusoidal carrier signal in phase quadrature with respect to said first sinusoidal signal;

(c) modulating said first sinusoidal carrier signal with a first modulation signal to produce a first modulated signal;

(d) modulating said second sinusoidal carrier signal with a second modulation signal in phase quadrature with respect to said first modulation signal to produce a second modulated signal;

(e) selectively modulating the polarity of said first and second modulated signals with first and second data signals, respectively, to produce first and second final signals, each said first and second data signals having possible transition times at every other MSK symbol interval, said first and second possible transition times being staggered in time by one symbol interval;

(f) adding said first and second final signals to produce a transmission signal; and (g) maintaining said first data signal at a constant level during said preamble portion whereby no polarity reversals in said first sinusoidal carrier occur during said preamble.

11. The method of claim 10 wherein the level of said second data signal is changed at each possible transition time of said second data signal during said preamble.

12. The method of claim 11 wherein said first sinusoidal carrier is a cosine carrier.

* * * * *